(12) United States Patent
Yerrabommanahalli et al.

(10) Patent No.: US 9,876,903 B2
(45) Date of Patent: Jan. 23, 2018

(54) APPARATUS, SYSTEM, AND METHOD FOR NOTIFYING A MOBILE STATION OF AN INCOMING CIRCUIT SWITCHED CALL DURING A PACKET SWITCHED SESSION

(71) Applicant: Apple Inc., Cupertino, CA (US)

(72) Inventors: Vikram B. Yerrabommanahalli, Sunnyvale, CA (US); Arun G. Mathias, Los Altos, CA (US); Prashant H. Vashi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 14/494,142

(22) Filed: Sep. 23, 2014

(65) Prior Publication Data
US 2015/0092613 A1    Apr. 2, 2015

Related U.S. Application Data

(60) Provisional application No. 61/884,497, filed on Sep. 30, 2013.

(51) Int. Cl.
*H04M 3/42*    (2006.01)
*H04W 76/02*    (2009.01)
(Continued)

(52) U.S. Cl.
CPC ......... *H04M 3/42042* (2013.01); *H04M 3/02* (2013.01); *H04W 76/026* (2013.01); *H04M 7/1205* (2013.01); *H04W 4/16* (2013.01)

(58) Field of Classification Search
CPC ............. H04M 3/4288; H04W 76/026; H04W 36/0022; H04W 4/16
See application file for complete search history.

(56) References Cited

U.S. PATENT DOCUMENTS 7,616,944 B2    11/2009    Gustavsson et al.
7,983,242 B2    7/2011    Nasielski et al.
(Continued)

FOREIGN PATENT DOCUMENTS

GB    2419258 B  *  4/2006    ............... H04Q 7/22

OTHER PUBLICATIONS

3GPP TS 23.237 v12.4.0 (Sep. 2013), 3rd Generation Partnership Project—Technical Specification Group Services and System Aspects—IP Multimedia Subsystem (IMS) Service Continuity—Stage 2 (Release 12), Sep. 12, 2013, 172 pages.*

*Primary Examiner* — Hoon J Chung
(74) *Attorney, Agent, or Firm* — Meyertons Hood Kivlin Kowert & Goetzel, P.C.; Jeffrey C. Hood; Joel L. Stevens

(57) ABSTRACT

Apparatus, system, and method for notifying a mobile station of an incoming circuit switched call during a packet switched session. During the packet switched session, a mobile station may receive a call notification of the circuit switched call. The call notification may be received via a packet switched network associated with the packet switched session. Additionally, the call notification may identify a calling party. In response, an indication of the circuit switched call may be displayed to a user on a display of the mobile station. This indication of the circuit switched call may identify the calling party. Additionally, the indication may be displayed while maintaining the packet switched session. In response, the user may provide input to the mobile station regarding whether to accept the circuit switched call. Based on this input, the mobile station may accept or reject the circuit switched call.

16 Claims, 11 Drawing Sheets

(51) Int. Cl.
*H04M 3/02* (2006.01)
*H04W 4/16* (2009.01)
*H04M 7/12* (2006.01)

(56) References Cited

U.S. PATENT DOCUMENTS

| | | |
|---|---|---|
| 8,046,470 B2 | 10/2011 | Lewis et al. |
| 8,254,356 B2 | 8/2012 | Asokan |
| 2002/0080770 A1* | 6/2002 | Hall ........................ H04W 4/16 370/352 |
| 2008/0130554 A1* | 6/2008 | Gisby ................. H04M 3/4234 370/328 |
| 2011/0207481 A1* | 8/2011 | Yin ................... H04W 36/0022 455/458 |
| 2012/0122459 A1* | 5/2012 | Wu ................... H04W 36/0022 455/437 |

\* cited by examiner

APPARATUS, SYSTEM, AND METHOD FOR NOTIFYING A MOBILE STATION OF AN INCOMING CIRCUIT SWITCHED CALL DURING A PACKET SWITCHED SESSION

PRIORITY INFORMATION

The present application claims benefit of priority to provisional patent application No. 61/884,497, entitled "Notifying a Mobile Station of an Incoming Circuit Switched Call During a Packet Switched Session", filed on Sep. 30, 2013, whose inventors are Vikram B. Yerrabommanahalli, Arun G. Mathias, and Prashant H. Vashi, which is hereby incorporated by reference in its entirety as if fully and completely set forth herein.

FIELD OF THE DISCLOSURE

The present application relates to wireless communication, and more particularly to an apparatus, system, and method for receiving an indication of an incoming circuit switched call during a packet switched session.

DESCRIPTION OF THE RELATED ART

Wireless communication systems are rapidly growing in usage. Further, wireless communication technology has evolved from voice-only communications to also include the transmission of data, such as Internet and multimedia content.

Some present wireless communication devices (e.g., cell phones) communicate between two or more wireless communication technologies, e.g., using a single radio. For example, these devices may communicate using packet switched networks and circuit switched networks, e.g., GSM and LTE, respectively. Currently, if the device is communicating in a packet switched session and an incoming circuit switched call occurs, caller information of the incoming call cannot be sent to the device without interrupting the packet switched session.

SUMMARY

Various embodiments are described of an apparatus, system, and method for providing an indication of an incoming circuit switched call during a packet switched session.

In particular, in one embodiment, during the packet switched session, a mobile station may receive a call notification of the circuit switched call. The call notification may be received via a packet switched network associated with the packet switched session. Additionally, the call notification may identify a calling party. In response, an indication of the circuit switched call may be displayed to a user on a display of the mobile station. This indication of the circuit switched call may identify the calling party. Additionally, the indication may be displayed while maintaining the packet switched session. In response, the user may provide input to the mobile station regarding whether to accept the circuit switched call. Based on this input, the mobile station may accept or reject the circuit switched call.

In one embodiment, a user equipment device (UE) may include a display, a first radio configured to perform wireless communication, and a processing element coupled to the first radio and the display. The UE may be configured to, during a packet switched session, receive a call notification of a circuit switched call from a network controller. The call notification may be received via a packet switched network associated with the packet switched session. Additionally, the call notification may include information identifying a calling party. The UE may be further configured to display an indication of the circuit switched call to a user on the display of the mobile station. The indication of the circuit switched call may identify the calling party. Additionally, while displaying the indication, the packet switched session may be maintained. The UE may be configured to receive user input accepting the circuit switched call. Finally, the circuit switched call may be established using a circuit switched network. Establishing the circuit switched call may include tuning the first radio from the packet switched network to the circuit switched network.

In one embodiment, a network controller of a packet switched network and a circuit switched network may include communication circuitry and a processing element coupled to the communication circuitry. The processing element and the communication circuitry may be configured to: during a packet switched session with a user equipment device (UE), receive an indication of an incoming circuit switched call from a calling party to the UE. In response to the indication of the incoming circuit switched call, the network controller may provide a call notification to the UE via a packet switched network associated with the packet switched session. The call notification may include information identifying the calling party. The network controller may receive an indication from the UE indicating acceptance of the circuit switched call. The network controller may establish the circuit switched call between the UE and the calling party using a circuit switched network.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

Figure 1:
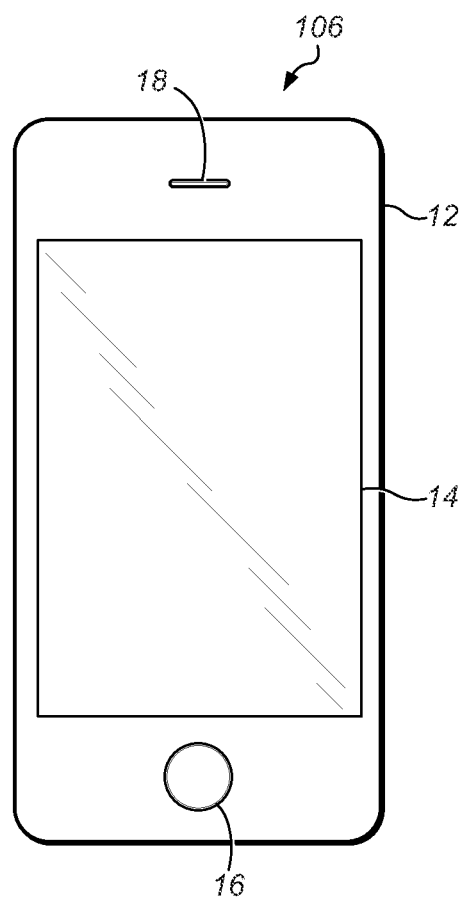
FIG. 1 illustrates an example user equipment (UE) according to one embodiment.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
  3GPP: Third Generation Partnership Project
  3GPP2: Third Generation Partnership Project 2
  GSM: Global System for Mobile Communications
  UMTS: Universal Mobile Telecommunications System
  TDS: Time Division Synchronous Code Division Multiple Access
  LTE: Long Term Evolution
  RAT: Radio Access Technology
  TX: Transmit
  RX: Receive
Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Time Division Synchronous Code Division Multiple Access (TD-SCDMA or TDS), Long Term Evolution (LTE), Advanced LTE, and/or other RATs. For example, the UE 106 may support at three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

The UE 106 may comprise two antennas which may be used to communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1×. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples antenna 1 and the DRX receiver chain receives samples from antenna 2, both on the same frequency (since they use the same local oscillator). The wireless circuitry in the UE 106 can be configured in real time depending on the desired mode of operation for the UE 106.

Figure 2:
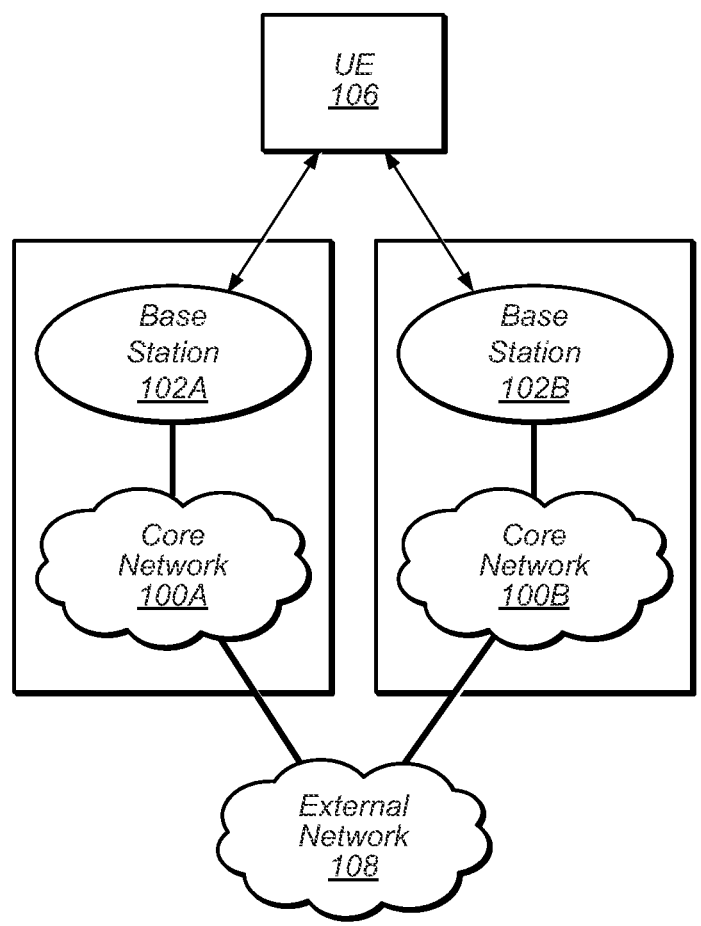
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In one embodiment, the UE 106 may be configured to use a first RAT that is a packet-switched technology (e.g., LTE) and a second RAT that is a circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
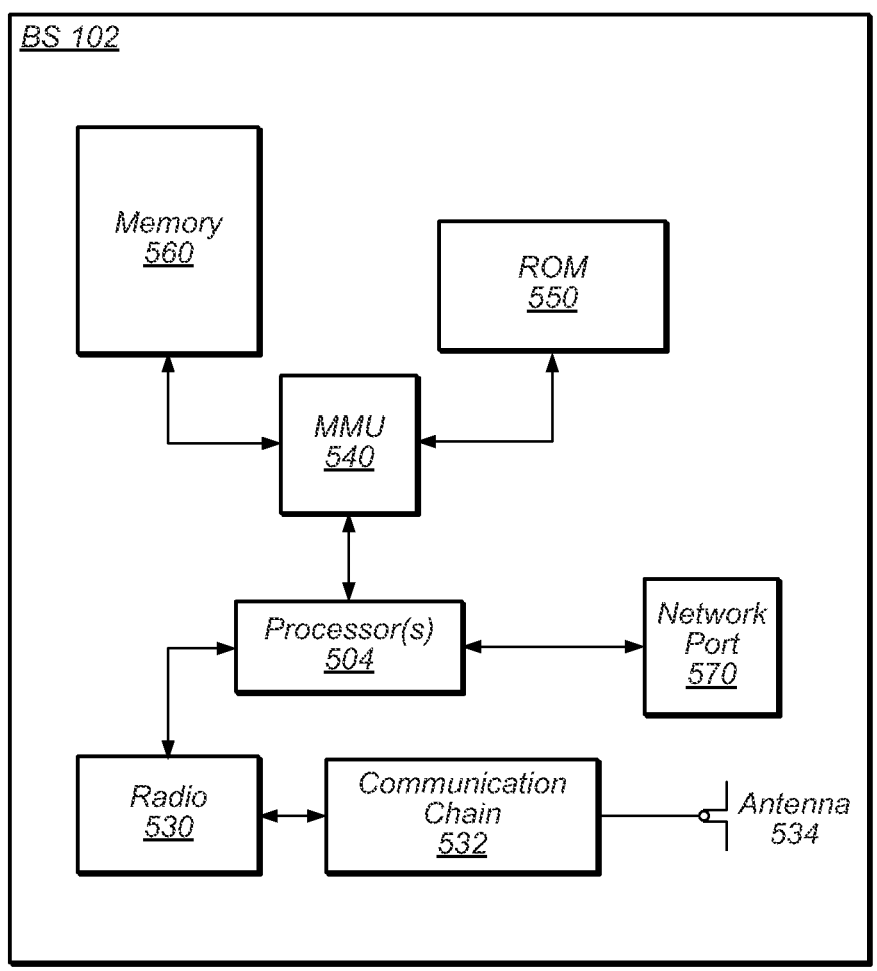
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, TDS, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
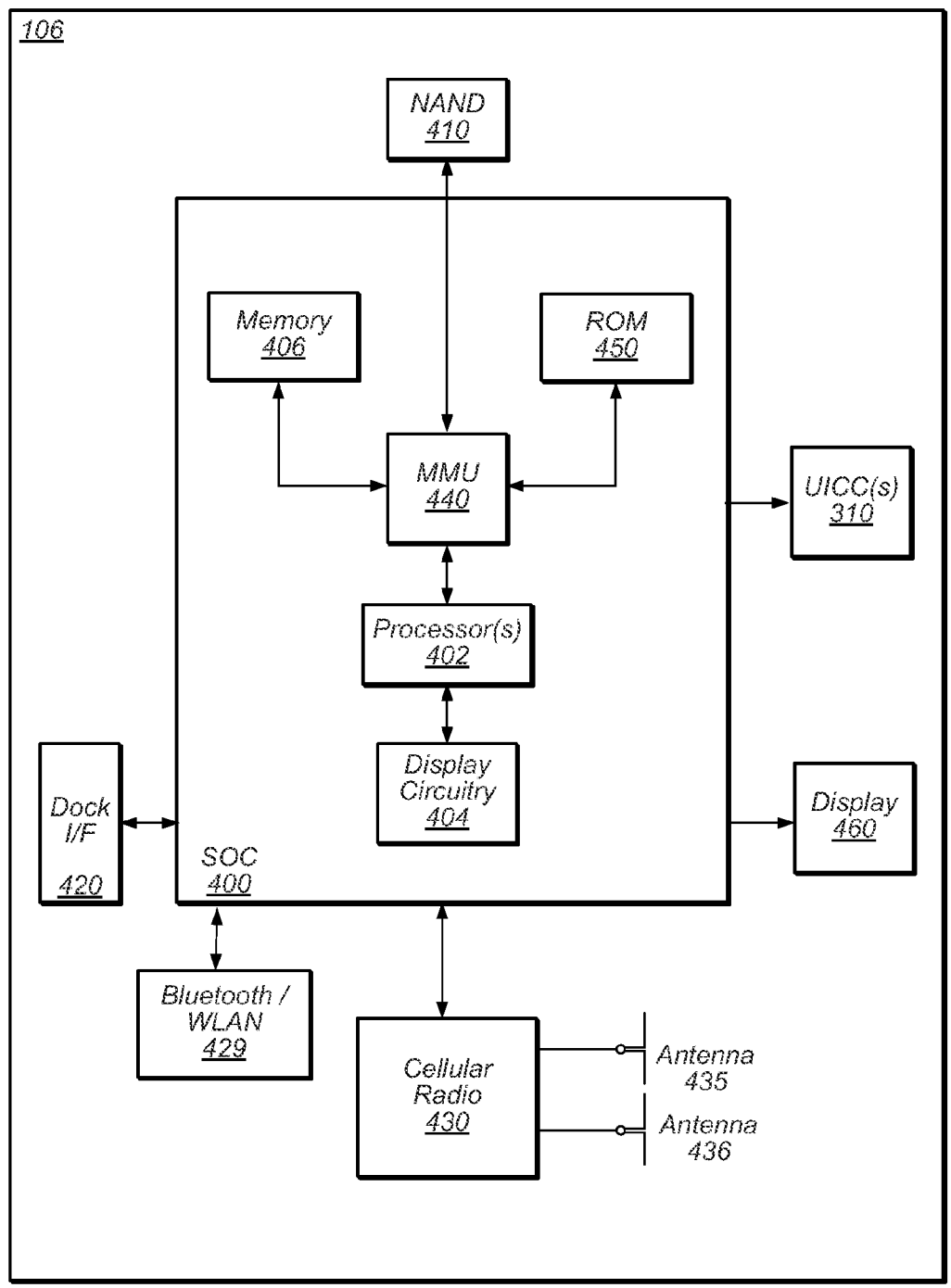
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, TDS, CDMA, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM or CDMA. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (e.g., and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
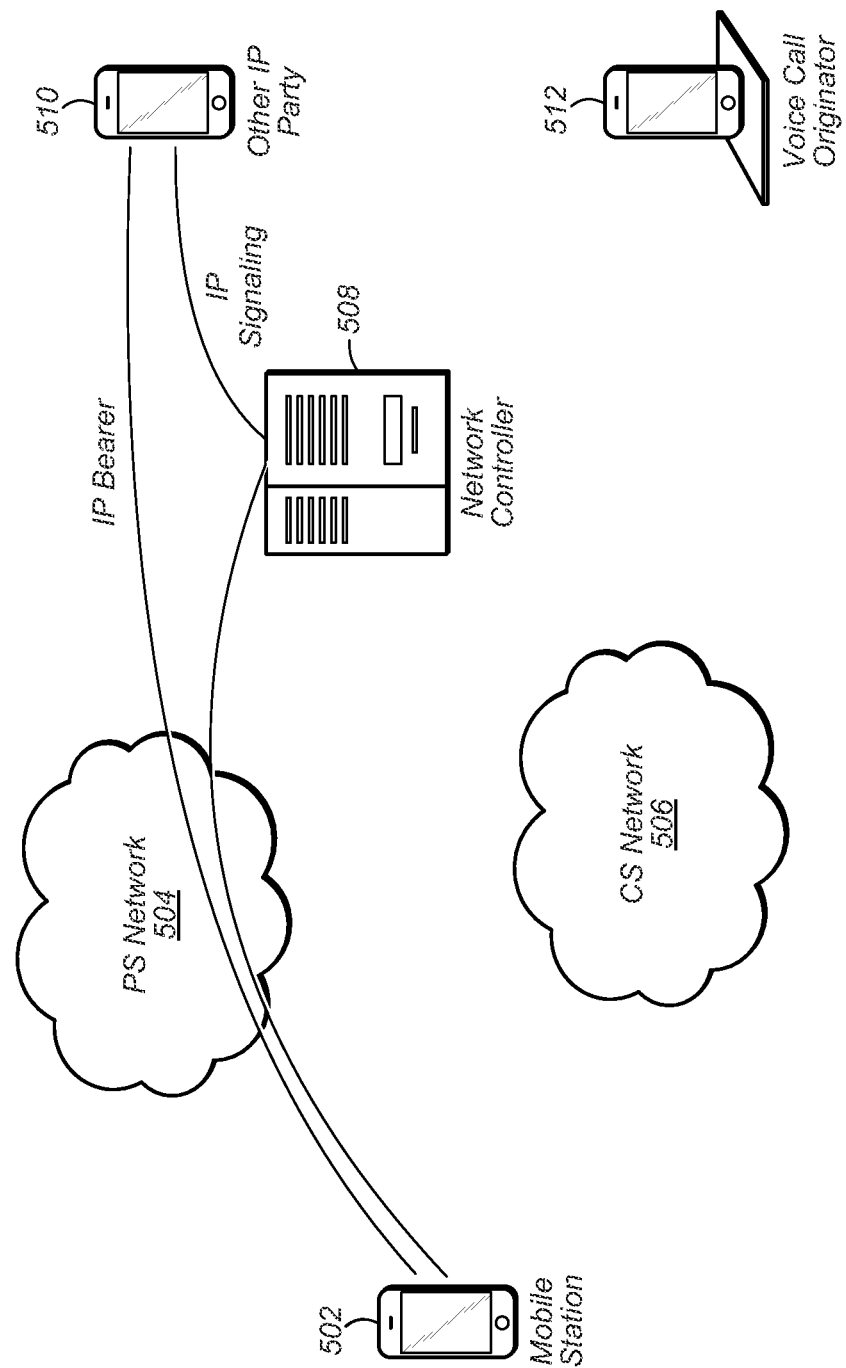
FIGS. 5-7 illustrate an exemplary system illustrating a packet switched session and an incoming circuit switched call.
Figure 6:
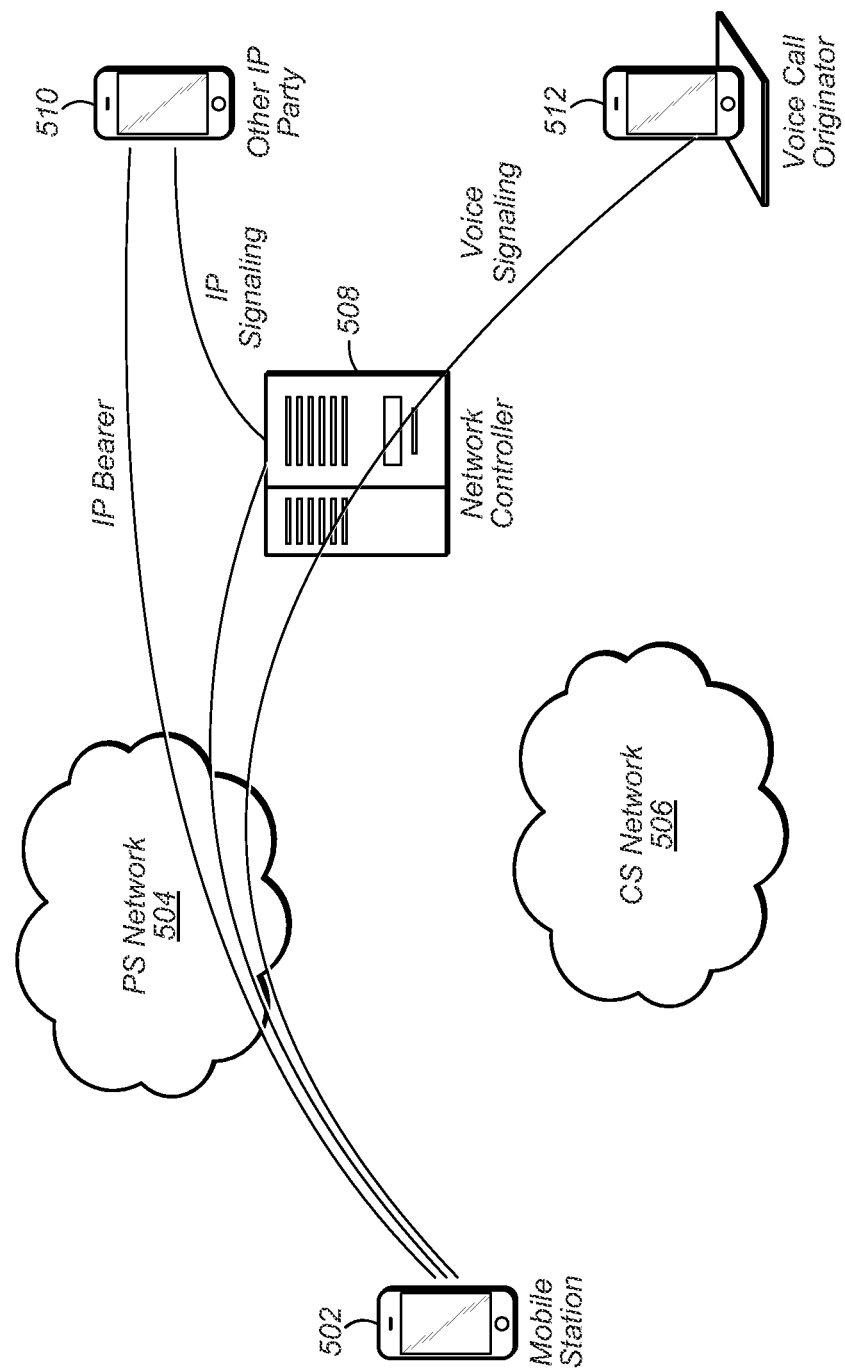
Figure 7:
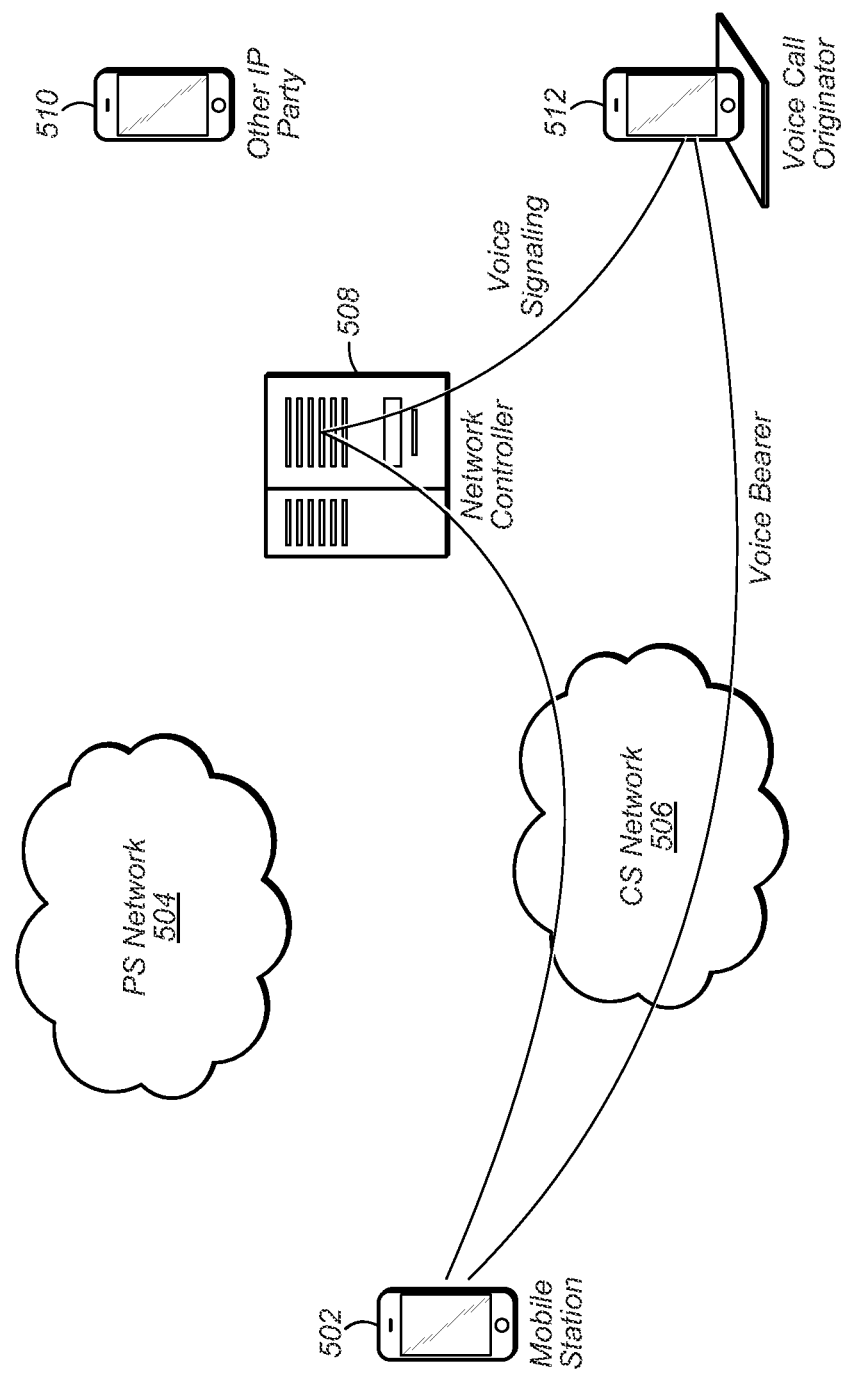

FIGS. 5-7—Exemplary System with Packet and Circuit Switched Communication

FIG. 5 illustrates an exemplary system where a mobile station (or UE) 502, e.g., with limited radio capabilities, such as a single radio for communicating with multiple RATs, is currently in a packet switched session with another party 510 over a packet switched network 504. As shown, the bearer path between the two parties is through the data network (e.g., comprising the packet switched (PS) network 504). Additionally, a signaling path is also through this network 504 and to the other party 510, but via a network controller 508. FIG. 5 also illustrates a circuit switched network 506 (e.g., a 1× circuit switched network), that is not currently in use. Additionally, there is a voice call originator 512 that is also not yet used.

The packet switched network 504 and the circuit switched network 506 may be any of various types of networks. For example, the packet switched network may be an LTE or eHRPD network. Additionally, the circuit switched network may be a CDMA, CDMA2000, 1×RTT, GSM, etc.

FIG. 6 illustrates the same system, where the voice call originator 512 has initiated a call to the mobile station or terminal 502. As shown, an indication of the voice call is provided via the packet switched network 504, through the network controller 508. This indication of the voice call may include information identifying the calling party, e.g., caller ID information, that would not otherwise be available to the called party if the call notification were sent through the circuit switched network.

FIG. 7 illustrates the same system, where the called party 502 has accepted the call. In this case, the call is now performed over the circuit switched network 506 rather than the packet switched network 504. The previous packet switched session has been torn down. As shown, the bearer path is through the circuit switched network 506 as well as the signaling path, except that the signaling path also includes the network controller 508.

Figure 8:
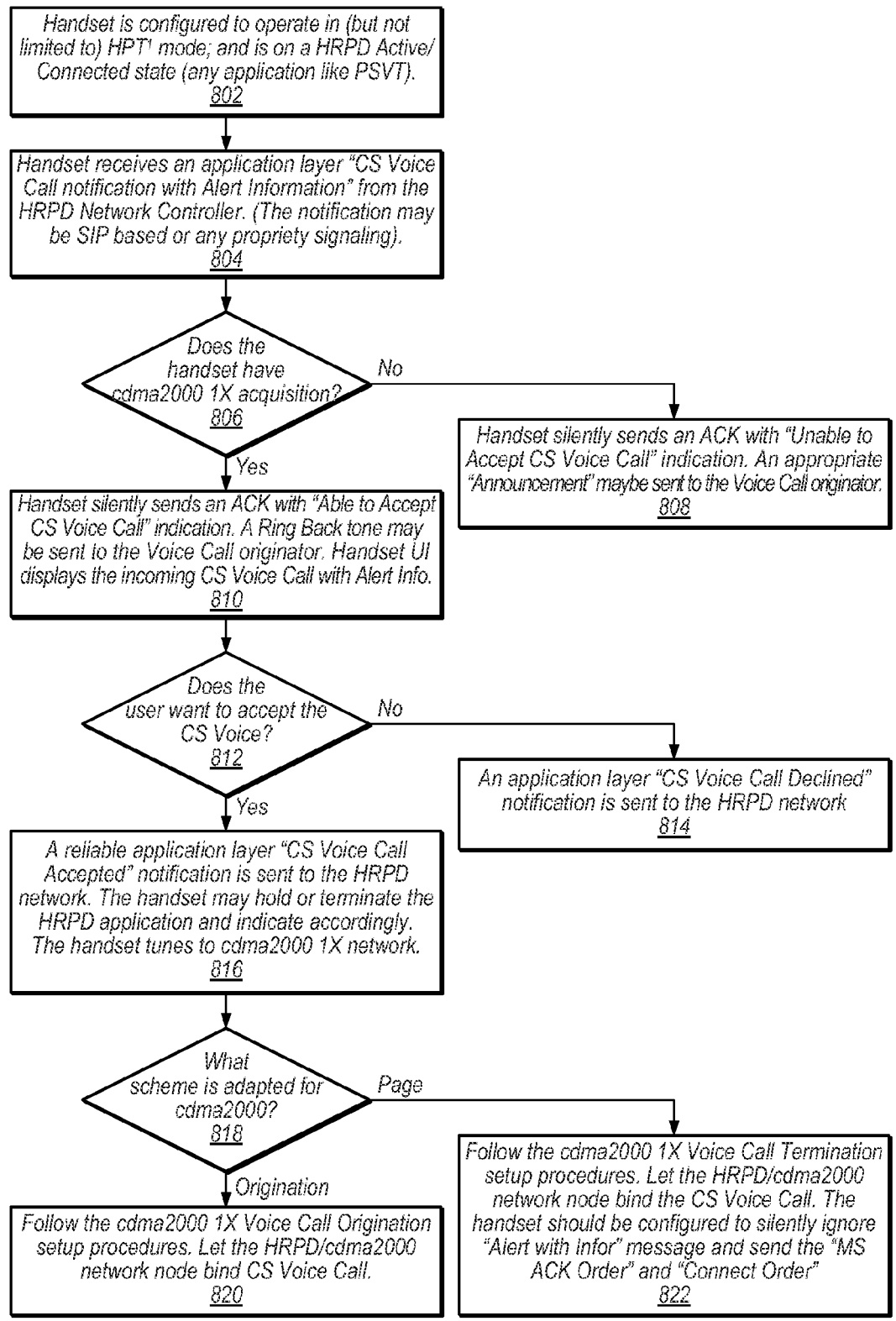
FIGS. 8 and 9 are flowchart diagrams illustrating embodiments of a method for receiving an indication of an incoming circuit switched call during a packet switched session.

FIG. 8—Receiving an Indication of a Circuit Switched Call During a Packet Switched Session FIG. 8 illustrates an exemplary method, e.g., performed by a mobile station, for receiving an indication of a circuit switched call during a packet switched session. The method shown in FIG. 8 may be used in conjunction with any of the computer systems or devices shown in the above Figures, among other devices. In various embodiments, some of the method elements shown may be performed concurrently, in a different order than shown, or may be omitted and/or considered optional. Additional method elements may also be performed as desired. As shown, this method may operate as follows.

Initially, in 802, the mobile station may communicate with another party ("the packet switched party") in a packet switched session over a packet switched network. In one embodiment, the mobile station (or handset) is configured to operate in (but not limited to) a high priority traffic mode, e.g., for high priority data such as a VOIP, videoconferencing, or other high priority or real time traffic sessions. For example, the mobile station may be engaged in a packet switched video telephony (PSVT) session.

Next, in 804, the mobile station may receive a call notification of an incoming circuit switched call from a calling party ("the circuit switched party") from a network controller. For example, the mobile station may receive an application layer "CS Voice Call Notification with Alert Information" from an HRPD ("High Rate Packet Data") network controller. The notification may be a session initiation protocol (SIP) notification, or may use any other appropriate signaling protocol, such as a proprietary signaling protocol, as desired. The call notification may include caller ID information of the circuit switched party.

Next, in 806, the mobile station may determine if it can acquire the circuit switched network (e.g., perform CDMA 2000 1× acquisition).

If the mobile station cannot, in 808, then the handset may automatically (e.g., silently) send an acknowledgement (ACK) to the network controller with an "Unable to Accept CS Voice Call" indication. Accordingly, an appropriate notification or announcement may be provided to the circuit switched party.

If the mobile station can acquire the circuit switched network, in 810, then the mobile station may send an ACK including an "Able to Accept CS Voice Call" indication to the network controller. Accordingly, a ring back (or other appropriate notification) may be provided to the circuit switched party.

Additionally, in 812, the mobile station may display an indication of the circuit switched call on a display of the mobile station. This indication may provide caller ID information of the circuit switched party. Additionally, the mobile station may maintain the packet switched session or connection while displaying this indication.

At this point, in 812, the user may choose to accept or reject the incoming call. Accordingly, continuing to 816, the mobile station may receive user input indicating acceptance of the call. Alternatively, in 814, the mobile station may receive user input rejecting the call. In another case, the user may simply ignore the call, letting the call go to voice mail.

If the user does not accept the call, in 814, a notification may be sent to the packet switched network, e.g., to the network controller. For example, an application layer "CS Voice Call Declined" notification may be sent. In this case, the mobile station may continue to communicate in the packet switched session.

If the user does accept the call, in 816, an indication may be sent to the packet switched network, e.g., to the network controller. For example, an application layer "CS Voice Call Accepted" notification may be sent. In addition, the mobile station may hold or terminate the packet switched application or session, and tune its radio (e.g., its single radio) to the circuit switched network. Where the mobile station is able to concurrently perform the circuit switched call and the packet switched session, e.g., by using multiple radios or time sharing the single radio, it may do so, if desired.

Depending on the mobile station or network, accepting the call may be handled in different manners, as indicated in 818. For example, the network may indicate a desired scheme in the call notification described above. Alternatively, or additionally, the mobile device may have a preconfigured method for handling the circuit switched call.

Depending on these factors, in 820, the mobile station may send an origination message, using origination setup procedures. Then, the network node may bind the CS call. Alternatively, in 822, the network (e.g., the circuit switched network) may send a page message and follow call termination setup procedures. In this case, the network node may bind the circuit switched call. Additionally, the mobile station may be configured to ignore (e.g., silently) an "Alert with Info" message and send a "MS ACK Order" and "Connect Order" message, as desired.

Figure 9:
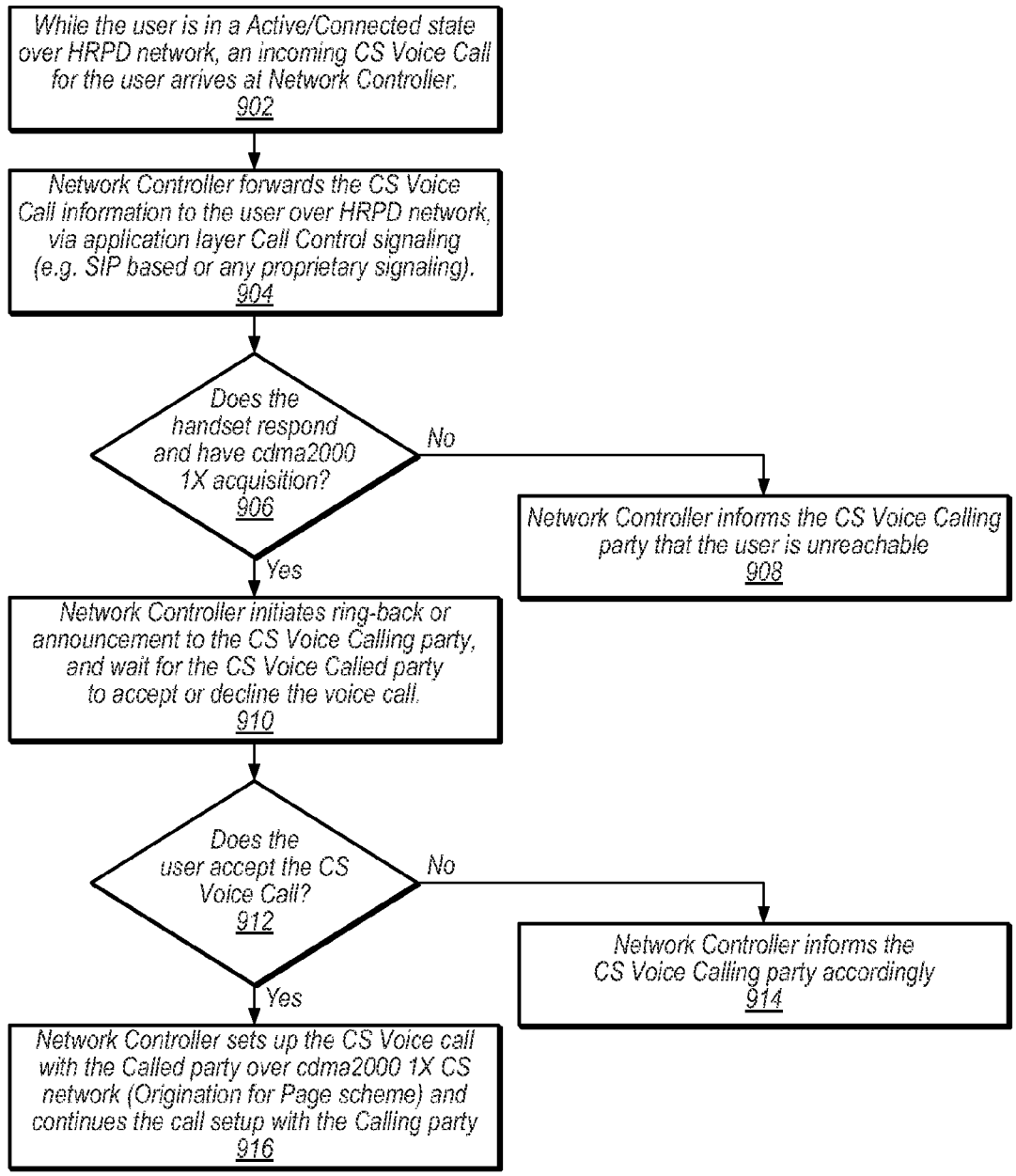

FIG. 9—Providing an Indication of a Circuit Switched Call During a Packet Switched Session FIG. 9 illustrates an exemplary method, e.g., performed by a network controller, for providing an indication of a circuit switched call during a packet switched session. The method shown in FIG. 9 may be used in conjunction with any of the computer systems or devices shown in the above Figures, among other devices. In various embodiments, some of the method elements shown may be performed concurrently, in a different order than shown, or may be omitted and/or considered optional. Additional method elements may also be performed as desired. As shown, this method may operate as follows.

Similar to FIG. 8, in 902, a mobile station may be involved in a packet switched session with a packet switched party. While the mobile station is in this session, in 904, an incoming circuit switched call from a circuit switched party may be received. In the example embodiment of FIG. 9, the mobile station may be in an active or connected state over HRPD network and an incoming CS voice call may arrive at the network controller.

In response, in 904, call information (e.g., including caller ID information) may be forwarded to the mobile station over the packet switched network, e.g., via application layer call signaling (e.g., SIP or any proprietary signaling).

In 906, If the handset does not respond and/or does not have acquisition of the circuit switched network, in 908, a notification or message may be sent to the circuit switched party that the mobile station is unreachable.

If the handset does respond and is able to acquire the circuit switched network, in 910, an indication (e.g., a ring back) may be provided to the circuit switched party by the network controller. Then, the method may wait for the mobile station to accept or decline the call in 912.

If the call is not accepted, in 914, the circuit switched party may be informed.

If the call is accepted, in 916, the call may be set up, e.g., according to origination or page schemes, similar to the description of FIG. 8 above.

Figure 10:
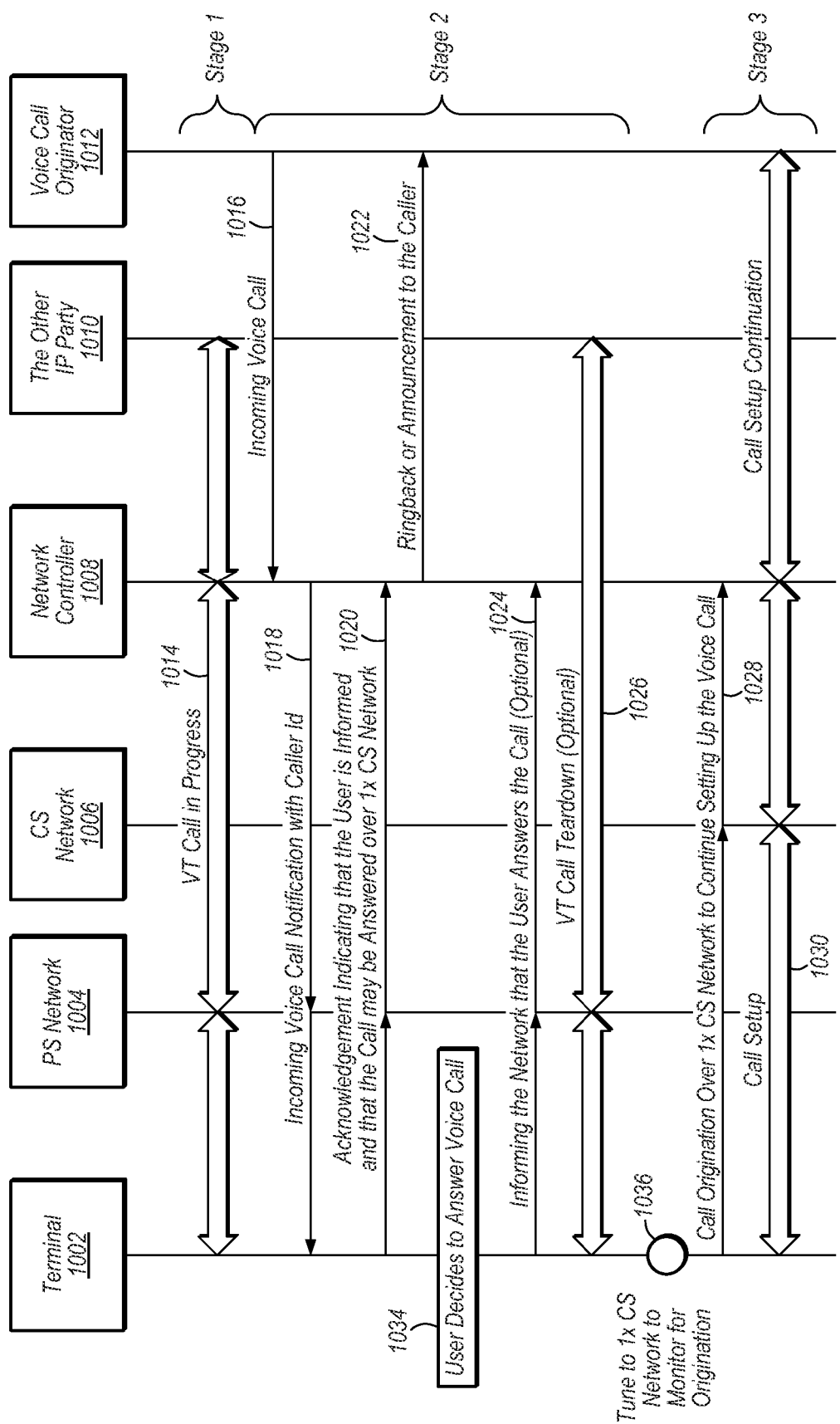
FIGS. 10 and 11 illustrate call flow diagrams corresponding to embodiments of FIGS. 8 and 9.
Figure 11:
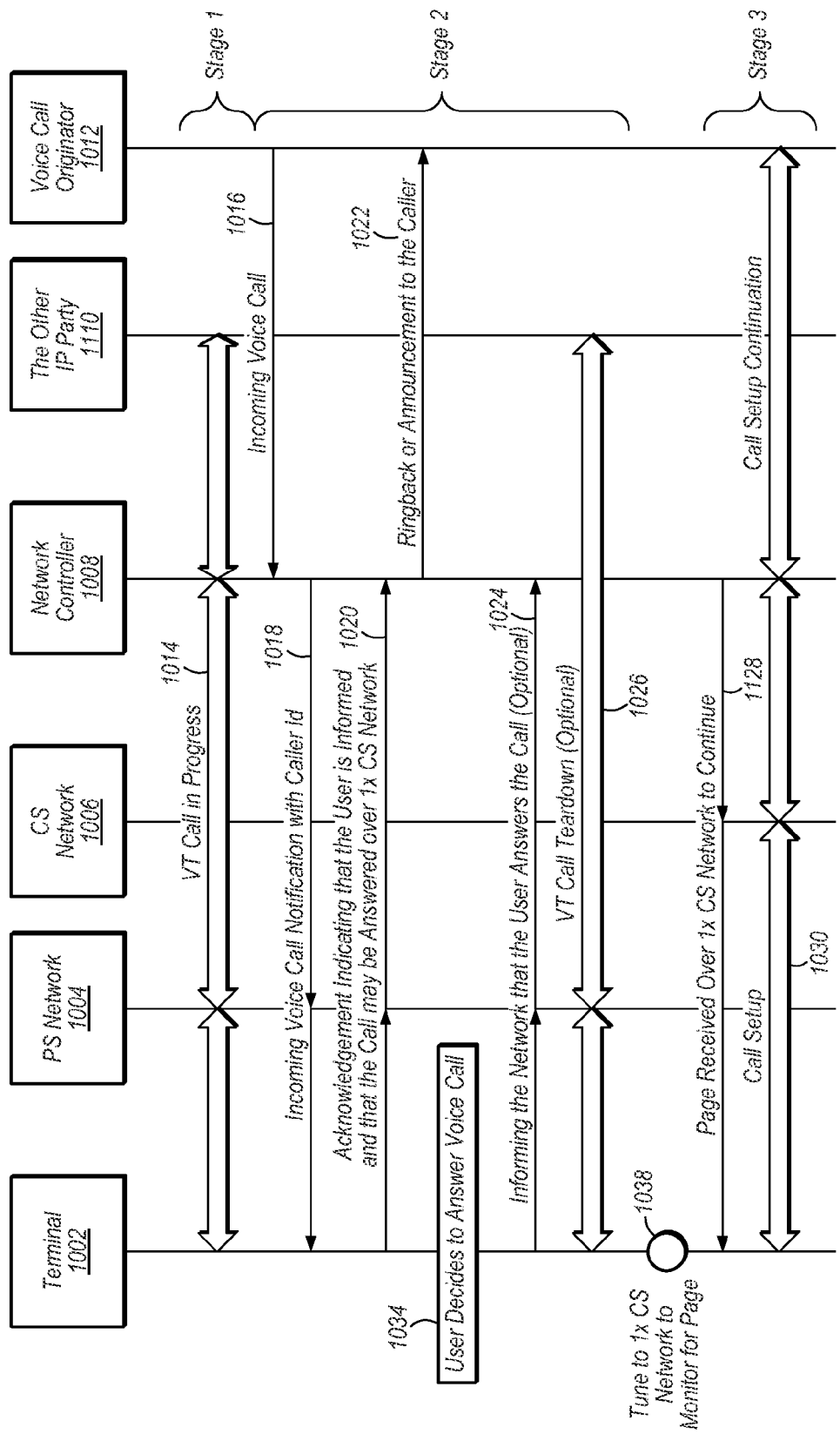

FIGS. 10 and 11—Exemplary Message Flow for Call Origination Scheme

FIGS. 10 and 11 illustrate exemplary message flow diagrams, e.g., corresponding to the exemplary methods of FIGS. 8 and 9, according to an exemplary call origination scheme. As shown, these flow diagrams involve a terminal 1002, PS network 1004, CS network 1006, network controller 1008, another IP party 1010, and a voice call originator 1012.

In Stage 1, an IP session 1014 may be in progress between the terminal and the other IP party 1010 of the IP session, via the network controller 1008 and the PS network 1004, as shown. In some embodiments the IP session may be a VOIP or PSVT call, as desired.

In Stage 2, an incoming voice call is provided from the voice call originator originator 1012 to the network controller 1008. As shown, the voice call may originate from the voice call originator 1012, and may involve signaling or message(s) 1016 to the network controller. In response, the network controller 1008 may provide an incoming voice call notification with caller ID 1018 to the terminal 1002 via the PS network 1004.

In response, the mobile station may provide an acknowledgement 1020 indicating the user is informed and that the call may be answered over the circuit switched network 1006. This message 1020 may similarly be transmitted through the PS network 1004 to the network controller 1008. The network controller 1008 may then provide a ringback or announcement 1022 to the voice call originator 1012.

If the user answers the call, the mobile station may provide an indication 1024 that the user answered the call to the network controller 1008, via the PS network 1004.

At this point, the IP session between the mobile station and the other party may be torn down, as indicated by 1026.

After the optional teardown 1026, the terminal 1002 may tune from the packet switched network 1004 to the circuit switched network 1006.

In stage 3, according to FIG. 10, the mobile station may provide a call origination message 1028 to the network controller to set up the voice call, via the circuit switched network 1006 (e.g., a 1× circuit switched network). Alternatively, as shown in FIG. 11, the paging scheme may be used, where a page 1128 is provided to the terminal 1002 from the network controller 1008 via the circuit switched network 1006.

After, the circuit switched call may be set up in 1030, using the circuit switched network 1006, as shown.

While FIGS. 5-11 are described as applying to CDMA 2000, they may apply to any desired RAT, e.g., any desired circuit switched network.

Embodiments of the described herein may be realized in any of various forms. For example, the systems and methods described herein may be realized as a computer-implemented method, a computer-readable memory medium, or a computer system. Alternatively, the systems and methods described herein may be realized using one or more custom-designed hardware devices such as ASICs. As another alternative, the systems and methods described herein may be realized using one or more programmable hardware elements such as FPGAs. The systems and methods described herein may also be implemented using any combination of the above.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for notifying a mobile station of an incoming circuit switched call during a packet switched session, comprising:
    at the mobile station:
        during the packet switched session, receiving a call notification message, wherein the call notification message provides initial notification to the mobile station of the circuit switched call, wherein the call notification message is received via a packet switched network associated with the packet switched session, wherein the call notification message comprises information identifying a calling party;
        determining whether the mobile station can acquire a circuit switched network utilizing a particular circuit switched radio access technology associated with the circuit switched call;
        in response to a determination that the mobile station can cannot acquire the circuit switched network;
        displaying an indication of the circuit switched call to a user on a display of the mobile station, wherein the indication of the circuit switched call identifies the calling party, wherein said displaying is performed while maintaining the packet switched session;
        receiving user input regarding whether to accept the circuit switched call; and
        based on the user input, the mobile station accepting or rejecting the circuit switched call, wherein accepting the circuit switched call comprises establishing the circuit switched call with the calling party using a circuit switched network, wherein establishing the circuit switched call comprises receiving a page from a network controller of the circuit switched call to establish the circuit switched call with the calling party.

2. The method of claim 1, wherein establishing the circuit switched call comprises:
    transmitting a call origination message to establish the circuit switched call with the calling party.

3. The method of claim 1, wherein the call notification message is received from the network controller.

4. The method of claim 1, wherein the mobile station uses a first radio to perform the packet switched session, wherein the method further comprises:
    in response to accepting the circuit switched call, tuning the first radio from the packet switched network to the circuit switched network.

5. The method of claim 4, wherein the mobile station uses a single radio to perform cellular packet switched and circuit switched communication, wherein the single radio is the first radio.

6. A user equipment device (UE), comprising:
    a display;
    a first radio configured to perform wireless communication; and
    a processor coupled to the first radio and the display, wherein the UE is configured to:
        during a packet switched session, receive a call notification message, wherein the call notification message provides initial notification to the processor of a circuit switched call from a network controller, wherein the call notification message is received via a packet switched network associated with the packet switched session, wherein the call notification message comprises information identifying a calling party;
        determine whether the UE can acquire a circuit switched network utilizing a particular circuit switched radio access technology associated with the circuit switched call;
        in response to a determination that the UE cannot acquire the circuit switched network, send a message to the network controller indicating that the UE cannot accept the circuit switched call;
        in response to a determination that the UE can acquire the circuit switched network:
            display an indication of the circuit switched call to a user on the display of the UE, wherein the indication of the circuit switched call identifies the calling party, wherein displaying is performed while maintaining the packet switched session;
            receive user input accepting the circuit switched call; and establish the circuit switched call with the calling party using the circuit switched network, wherein establishing the circuit switched call comprises tuning the first radio from the packet switched network to the circuit switched network and receiving a page from the network controller to establish the circuit switched call with the calling party.

7. The UE of claim 6, wherein establishing the circuit switched call comprises:
transmitting a call origination message to the network controller to establish the circuit switched call with the calling party.

8. The UE of claim 6, wherein the UE uses a single radio to perform cellular packet switched and circuit switched communication, wherein the single radio is the first radio.

9. The UE of claim 6, wherein the packet switched network comprises a long term evolution (LTE) network.

10. The UE of claim 6, wherein the circuit switched network comprises a code division multiple access (CDMA) network.

11. The UE of claim 6, wherein the circuit switched network comprises a global system for mobile communications (GSM) network.

12. A non-transitory computer accessible memory medium comprising program instructions which, when executed at a user equipment device (UE), cause the UE to:
during a packet switched session, receive, using a first radio of the UE, a call notification message, wherein the call notification message provides initial notification to a processor of the UE of a circuit switched call from a network controller, wherein the call notification message is received via a packet switched network associated with the packet switched session, wherein the call notification message comprises information identifying a calling party;
determine whether the UE can acquire a circuit switched network utilizing a particular circuit switched radio access technology associated with the circuit switched call;
in response to a determination that the UE cannot acquire the circuit switched network, send a message to the network controller indicating that the UE cannot accept the circuit switched call;
in response to a determination that the UE can acquire the circuit switched network:
display an indication of the circuit switched call to a user on a display of the UE, wherein the indication of the circuit switched call identifies the calling party, wherein displaying is performed while maintaining the packet switched session;
receive user input accepting the circuit switched call; and
establish the circuit switched call with the calling party using the circuit switched network, wherein establishing the circuit switched call comprises tuning the first radio from the packet switched network to the circuit switched network and receiving a page from the network controller to establish the circuit switched call with the calling party.

13. The non-transitory computer accessible memory medium of claim 12, wherein establishing the circuit switched call comprises:
transmitting a call origination message to the network controller to establish the circuit switched call with the calling party.

14. The non-transitory computer accessible memory medium of claim 12, wherein the UE uses a single radio to perform cellular packet switched and circuit switched communication, wherein the single radio is the first radio.

15. The non-transitory computer accessible memory medium of claim 12, wherein the packet switched network comprises a long term evolution (LTE) network.

16. The non-transitory computer accessible memory medium of claim 12, wherein the circuit switched network comprises a code division multiple access (CDMA) network.

\* \* \* \* \*